(12) United States Patent
Yang

(10) Patent No.: US 6,184,652 B1
(45) Date of Patent: Feb. 6, 2001

(54) MOBILE PHONE BATTERY CHARGE WITH USB INTERFACE

(76) Inventor: Wen-Chin Yang, No. 6, Lane 218, Chung Shing Rd., Sec. 2, Hsin Tien City, Taipei Hsien (TW)

( * ) Notice: Under 35 U.S.C. 154(b), the term of this patent shall be extended for 0 days.

(21) Appl. No.: 09/552,009

(22) Filed: Apr. 19, 2000

(51) Int. Cl.[7] .................................................. H01M 10/46
(52) U.S. Cl. .............................................. 320/110; 320/114
(58) Field of Search ..................................... 320/107, 110, 320/111, 114, 137; 439/638

(56) References Cited

U.S. PATENT DOCUMENTS 5,871,368 * 2/1999 Erdner et al. .
5,884,086 * 3/1999 Amoni et al. .
5,969,750 * 10/1999 Hsieh et al. .
6,006,088 * 12/1999 Couse .

* cited by examiner

Primary Examiner—Edward H. Tso
(74) Attorney, Agent, or Firm—Dougherty & Troxell

(57) ABSTRACT

This invention relates to a Mobile phone battery charger with USB interface which is composed of a compatible plug, an DC converter and a Mobile phone battery charging plug. The compatible plug can be inserted into the USB interface socket of computer or any environmental equipment so as to get electric power from computer, furthermore, the DC converter can convert computer USB interface into necessary charging voltage and transmit to different type Mobile phone by means of the Mobile phone battery charging plug for charging Mobile phone battery. In addition, the Mobile phone battery charger with USB interface also can be connected to various Mobile phone battery charging seat for charging.

2 Claims, 4 Drawing Sheets

MOBILE PHONE BATTERY CHARGE WITH USB INTERFACE

BACKGROUND OF THE INVENTION (1) Field of the Invention

This invention relates to a Mobile phone battery charger with USB (Universal Serial Bus) interface, especially an USB interface which can get electric power from computer USB interface.

(2) Description of the Prior Art

The conventional Mobile phone battery charger can be classified into battery seat charger and car charger and travel charger, but such kind of Mobile phone battery charger cannot suit for the charging voltage of any kind Mobile phone battery, furthermore, it is very inconveniently for user to carry the conventional Mobile phone battery charger.

The USB (Universal Serial Bus) interface is used widely on computer for connecting other environmental equipments, furthermore, the USB interface can be extended to use on many computer environmental equipments for connecting with each other. If we install the USB interface on the Mobile phone battery charger, the Mobile phone battery charger can get electric power from the computer USB interface for charging Mobile phone battery.

SUMMARY OF THE INVENTION

It is therefore the main object of this invention to provide a Mobile phone battery charger with USB interface, the USB interface of battery charger can switch to computer and get electric power from the computer for charging the Mobile phone battery charger.

BRIEF DESCRIPTION OF THE DRAWINGS

In the drawings, which illustrate the preferred embodiments and modes of operation, and in which like reference characters designate the same or similar parts throughout the several views.

DETAILED DESCRIPTION OF THE EMBODIMENT

Figure 1:
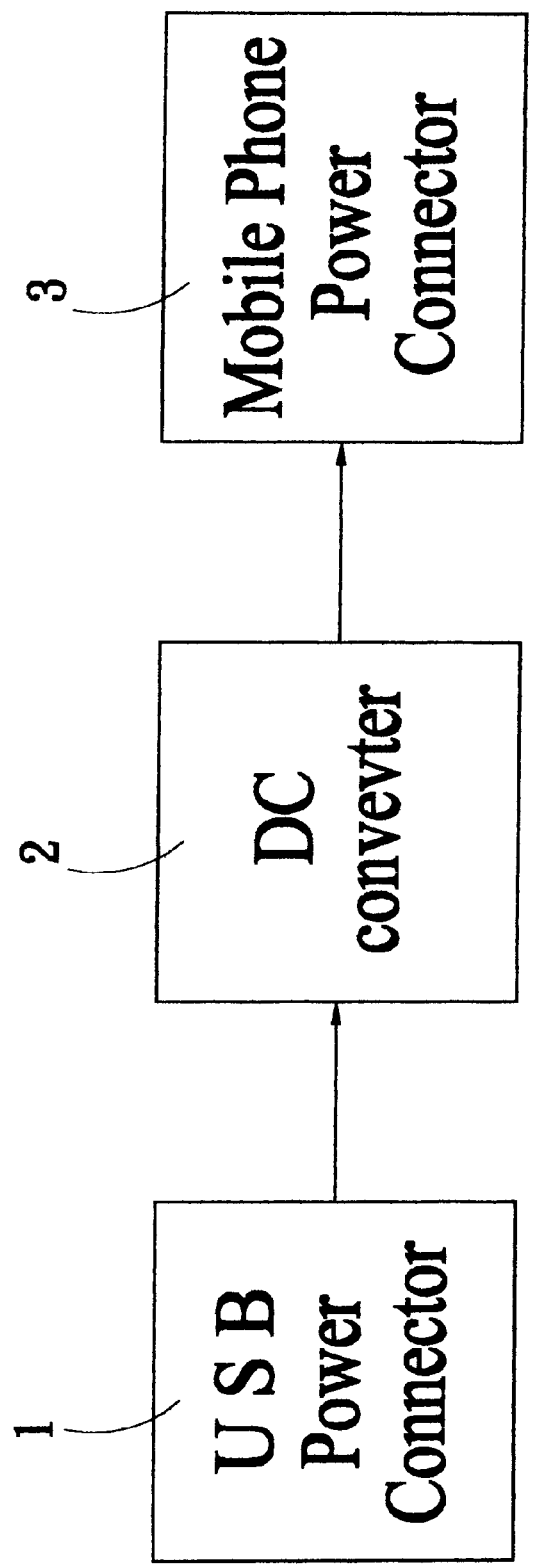
FIG. 1 is a flow chart showing the operation process of the Mobile phone battery charger with USB interface converting computer electric power to the Mobile phone power connector.

Referring to FIG. 1, the present invention relates to a Mobile phone battery charger with USB interface, the USB interface of this Mobile phone battery charger can be connected to the computer USB interface power connector (1) for transmitting electric power from computer to the Mobile phone battery power connector. The Mobile phone battery charger have an DC converter (2) formed therein, the DC converter (2) can convert computer voltage into demanded voltage for Mobile phone and transmit the voltage to Mobile phone power connector(3) for charging the Mobile phone battery and Mobile phone using. It is well known by those skilled in the art, the voltage of computer USB interface power is+5V, the maximum current is 0.5 A. The charging voltage is different for different type of Mobile phone. The present Mobile phone battery charger can regulate the voltage transmitted from computer according to the type of Mobile phone by means of the DC converter (2).

Figure 2:
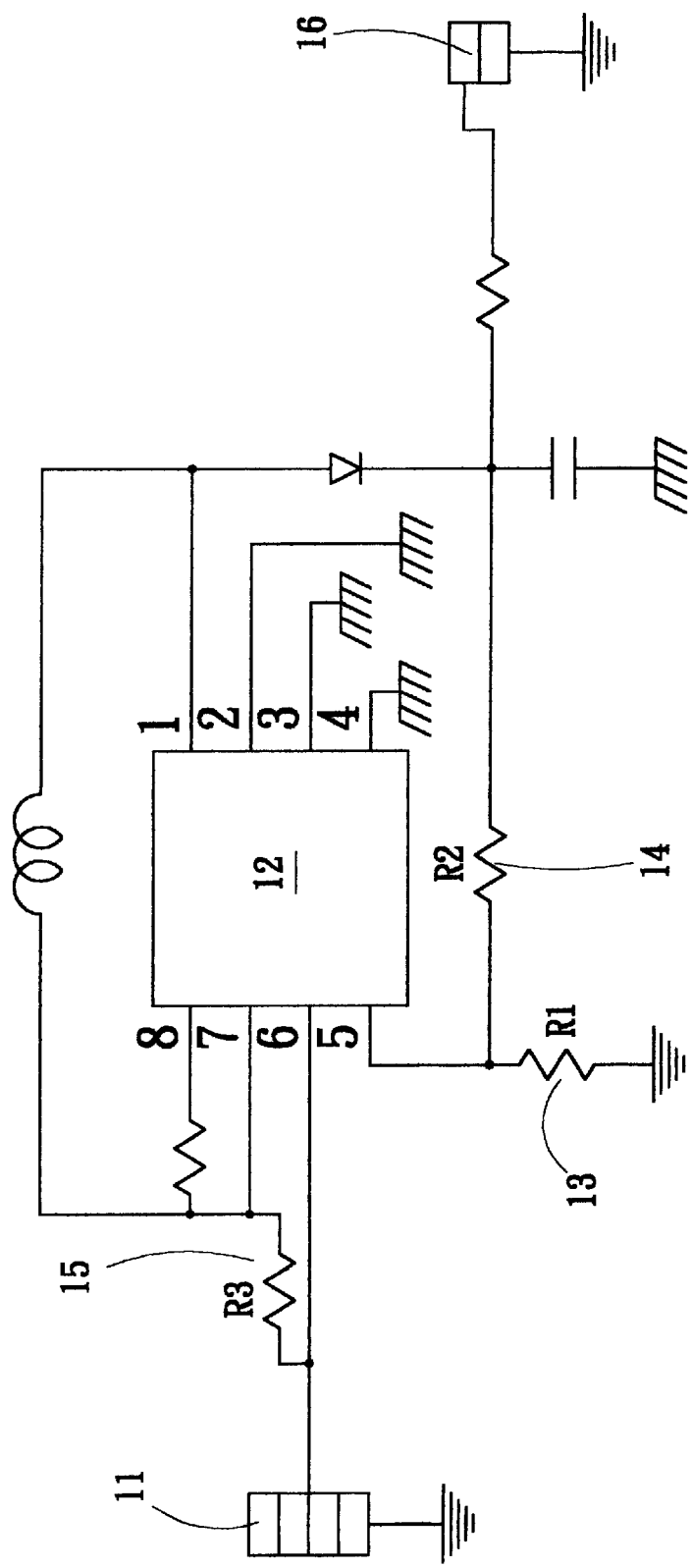
FIG. 2 is a circuit diagram showing the circuit of FIG. 1.

The FIG. 2 shows the circuit diagram of this invention, the Mobile phone battery charger (1) having an USB interface compatible plug (11), the compatible plug (11) can be connected to ant computer or environmental equipment having USB interface socket, furthermore, the Mobile phone battery charger (1) with USB interface having a converter (2) in which have a converting ICE (12), the converting IC (12) can convert the voltage transmitted from computer into the demanded charging voltage for different type of Mobile phone. The variable resistance R1 (13) and R2 (14) can be changed according to different type of Mobile phone, the resistance R3 (15) being used for protecting the circuit diagram of USB interface from shorting. Meanwhile, the USB compatible plug can connect to different types of the Mobile phone power connector (16) to adapt different product of the Mobile phone.

Figure 3:
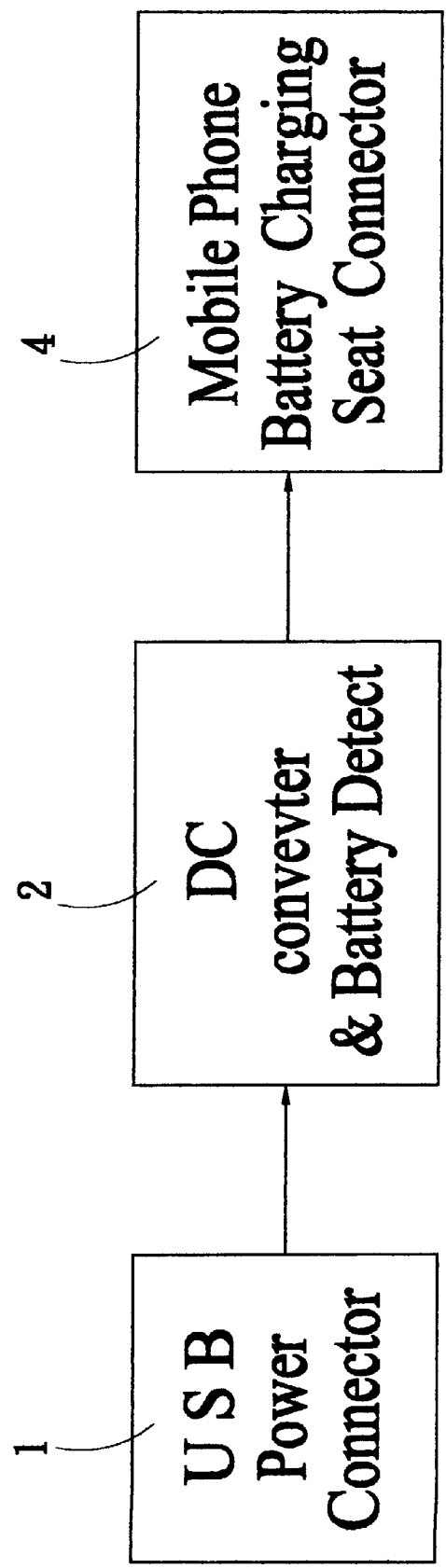
FIG. 3 is a flow chart showing the operation process of the Mobile phone battery charger with USB interface converting electric power to the Mobile phone battery charging seat.
Figure 4:
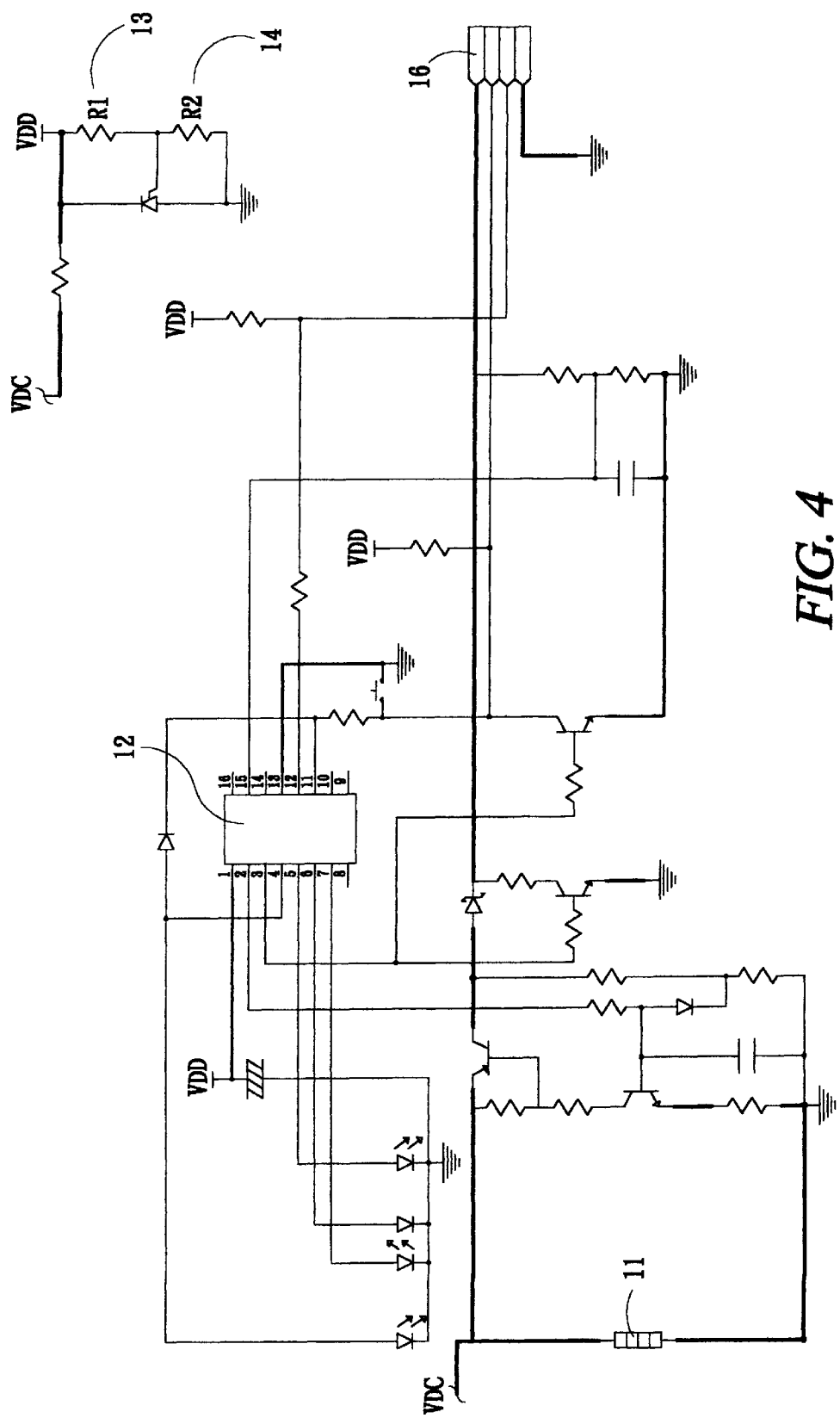
FIG. 4 is a circuit diagram showing the circuit of FIG. 3.

FIG. 3 and FIG. 4 shows the Mobile phone battery charger with USB interface converting computer electric power to the Mobile phone battery charging seat. The circuit diagram in FIG. 3 is similar to the circuit diagram in FIG. 1, therefor it merely convert the desired voltage to the Mobile phone battery charging seat connector (4) for charging the Mobile phone battery. But the circuit diagram is more complex because the Mobile phone battery charging seat would detect the type of Mobile phone battery (such as Li battery or Ni-MH battery) firstly, then detect the quantity of electricity of the Mobile phone battery. In general, the Mobile phone battery charging seat have an Ac to DC converter or transformer which can convert house-service voltage AC 110V or 220V or others into lower DC voltage, then transforming to necessary charging voltage for different Mobile phone battery. The present Mobile phone battery charging seat is designed to detect automatically the type of Mobile phone battery and convert the voltage from the USB interface into desired voltage for charging the Mobile phone battery by means of converting IC in the converter thus the user dose not need to purchase different kinds of the battery charging seat as to the different material made f the batteries.

Accordingly, the present invention has following advantages:

(1) The Mobile phone battery charger with USB interface have smaller volume because it does not install any AC to DC converter or transformer.

(2) The Mobile phone battery charger with USB interface can be switched to any computer or environmental equipment having USB interface for charging without utilizing the AC 110V or 220V power or others.

(3) The Mobile phone battery charger with USB interface can be connected to different Mobile phone power connector directly for charging phone battery.

(4) The Mobile phone battery charger with USB interface can be connected to different Mobile phone battery charging seat for charging Mobile phone battery.

(5) The Mobile phone battery charger with USB interface have a simple circuit which can prevent user from shocking.

What is claimed is:

1. A Mobile phone battery charger with USB interface which comprising:

a compatible plug which can be inserted into the USB interface socket of computer or environmental equipment;

an DC converter which can convert computer USB interface voltage into demanded charging voltage and transmit to the Mobile phone battery;

a Mobile phone battery charging plug which can be inserted into the Mobile phone power connector; the above Mobile phone battery charger with USB interface characterized in that; the Mobile phone battery charger with USB interface can get electric power from computer USB interface and convert into necessary charging voltage for different Mobile phone type by means of said DC converter.

2. A Mobile phone battery charger with USB interface as claimed in claim 1, wherein said DC converter can convert computer USB interface voltage into demanded voltage and transmit to different type of Mobile phone battery charging seat for charging Mobile phone battery.

* * * * *